United States Patent
Ma et al.

(10) Patent No.: US 9,632,349 B2
(45) Date of Patent: Apr. 25, 2017

(54) LIQUID CRYSTAL DISPLAY PANEL STRUCTURE AND MANUFACTURE METHOD THEREOF

(71) Applicant: Shenzhen China Star Optoelectronics Technology Co., Ltd., Shenzhen, Guangdong (CN)

(72) Inventors: Chao Ma, Guangdong (CN); Yungjui Lee, Guangdong (CN); Xiaolong Ma, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 176 days.

(21) Appl. No.: 14/426,988

(22) PCT Filed: Sep. 19, 2014

(86) PCT No.: PCT/CN2014/086892
§ 371 (c)(1),
(2) Date: Mar. 9, 2015

(87) PCT Pub. No.: WO2016/033841
PCT Pub. Date: Mar. 10, 2016

(65) Prior Publication Data
US 2016/0246106 A1     Aug. 25, 2016

(30) Foreign Application Priority Data
Sep. 2, 2014   (CN) .......................... 2014 1 0443892

(51) Int. Cl.
G02F 1/1339    (2006.01)
G02F 1/1333    (2006.01)
(Continued)

(52) U.S. Cl.
CPC ...... G02F 1/133512 (2013.01); G02F 1/1339 (2013.01); G02F 1/1341 (2013.01);
(Continued)

(58) Field of Classification Search
CPC ........ G02F 1/13; G02F 1/1339; G02F 1/1335; G02F 1/133512; G02F 1/1368;
(Continued)

(56) References Cited

U.S. PATENT DOCUMENTS

| | | | |
|---|---|---|---|
| 2004/0075801 A1* | 4/2004 | Choi | G02F 1/1339 349/153 |
| 2005/0073637 A1* | 4/2005 | Liao | G02F 1/1339 349/153 |
| 2013/0154949 A1* | 6/2013 | Jamshidi Roudbari | G06F 3/041 345/173 |

FOREIGN PATENT DOCUMENTS

| | | |
|---|---|---|
| CN | 201110932 Y | 9/2008 |
| CN | 201917747 U | 8/2011 |
| CN | 104007584 A | 8/2014 |

* cited by examiner

*Primary Examiner* — Thoi Duong
(74) *Attorney, Agent, or Firm* — Andrew C. Cheng

(57) ABSTRACT

The present invention provides a liquid crystal display panel structure and a manufacture method thereof. The liquid crystal display panel structure comprises a CF substrate (1), a TFT substrate (3), a liquid crystal layer filled between the CF substrate (1) and the TFT substrate (3), sealant (7) coated between the CF substrate (1) and the TFT substrate (3) and a black matrix (5) arranged between the CF substrate (1) and the TFT substrate (3); the black matrix (5) is positioned at periphery of an active area (AA) on the CF substrate (1), and a height thereof is smaller than a distance between the CF substrate (1) and the TFT substrate (3), and the black matrix (5) comprises a plurality of trenches (51), and each of the trenches (51) penetrates the black matrix (5) to form a
(Continued)

hollow construction, and the sealant (7) is positioned on the black matrix (5) and fills in the trenches (51). Such structure is capable of promoting the adhesive force between the CF substrate and the TFT substrate and preventing separation of the CF substrate and the TFT substrate without any additional cost.

11 Claims, 4 Drawing Sheets

(51) Int. Cl.
*G02F 1/1335* (2006.01)
*G02F 1/1341* (2006.01)
*G02F 1/1368* (2006.01)

(52) U.S. Cl.
CPC ...... *G02F 1/1368* (2013.01); *G02F 1/133514* (2013.01); *G02F 1/13394* (2013.01); *G02F 2001/13398* (2013.01)

(58) Field of Classification Search
CPC ........... G02F 1/13394; G02F 1/133514; G02F 1/136209; G02F 1/1333; G02F 1/1362; G02F 2001/133388; G02F 2001/13398; G02F 2202/28; H01L 51/524; H01L 33/56; H05B 33/04
USPC ......... 349/43, 106, 153, 110, 190, 122, 156, 349/187
See application file for complete search history.

LIQUID CRYSTAL DISPLAY PANEL STRUCTURE AND MANUFACTURE METHOD THEREOF

FIELD OF THE INVENTION

The present invention relates to a display technology field, and more particularly to a liquid crystal display panel structure and a manufacture method thereof.

BACKGROUND OF THE INVENTION

LCD (Liquid Crystal Display) possesses many advantages of being ultra thin, power saved and radiation free. It has been widely utilized in, such as mobile phones, PDAs (personal digital assistance), digital cameras, laptop screens or notebook screens.

The present thin film transistor liquid crystal display comprises a shell, a LCD panel located in the shell and a backlight module located in the shell. Particularly, the structure of the LCD panel mainly comprise a TFT Array Substrate (Thin Film Transistor Array Substrate), a CF (Color Filter) and a Liquid Crystal Layer. The working principle is that the light of backlight module is reflected to generate images by applying driving voltages to the two glass substrate for controlling the rotations of the liquid crystal molecules.

Generally, the CF substrate and the TFT substrate are assembled and attached with sealant. The sealant generally comprises acrylic, epoxy resin, photoinitiator and et cetera. By heating the sealant, irradiating the sealant with UV light or heating and UV light irradiating the sealant simultaneously, the solidification of the sealant is achieved to assemble and attach the CF substrate and the TFT substrate together. In prior arts, the main way of solidifying the sealant is simultaneous heating plus UV light irradiation. FIG. 1 is a top view diagram of a liquid crystal display panel structure according to prior art. The CF substrate 100 and the TFT substrate 300 of the liquid crystal display panel structure are assembled and attached with the sealant. For preventing the damages caused by the sealant to the Polyimide (PI) alignment film and liquid crystal material inside the CF substrate 100 and the TFT substrate 300 during the solidifying process of the sealant 500 with UV light irradiation, a Black Matrix (BM) 700 is further arranged at the peripheral district of the active area AA For achieving the formation of the narrow frame of the liquid crystal display panel, the sealant is generally coated on the black matrix to overlap the black matrix and the sealant. The position which previously is prepared for coating sealant can be saved for increasing the active area and attaching the CF substrate and the TFT substrate at the same time.

However, issues exist as coating the sealant on the black matrix, which affects the adhesive force between the CF substrate and the TFT substrate. Because the black matrix directly contacts the CF substrate and the adhesive force of the black matrix to the glass substrate is smaller which can easily cause the separation of the CF substrate and the TFT substrate. Therefore, most of the separation phenomena of the two substrates in the liquid crystal display panels happen between the black matrix and the CF substrate. Particularly, as the dimensions of the liquid crystal display panels increases, some unreasonable structure designs of the assembly modules can cause the separation of the CF substrate and the TFT substrate more easily and more serious losses.

By improving the material of the black matrix, the adhesive force of the black matrix to the glass substrate can be promoted for attempting to solve the aforesaid issues. However, the cost for developing the new black matrix material is much higher.

SUMMARY OF THE INVENTION

An objective of the present invention is to provide a Liquid crystal display panel structure, which the structure is capable of promoting the adhesive force between the CF substrate and the TFT substrate and preventing separation of the CF substrate and the TFT substrate without any additional cost.

Another objective of the present invention is to provide a manufacture method of a Liquid crystal display panel structure, which is capable of promoting the adhesive force between the CF substrate and the TFT substrate and preventing separation of the CF substrate and the TFT substrate under circumstance of adding zero cost.

For realizing the aforesaid objective, the present invention first provides a Liquid crystal display panel structure, comprising a CF substrate, a TFT substrate oppositely positioned to the CF substrate, a liquid crystal layer filled between the CF substrate and the TFT substrate, sealant coated between the CF substrate and the TFT substrate and a black matrix arranged between the CF substrate and the TFT substrate, and the black matrix is positioned at periphery of an active area on the CF substrate, and a height thereof is smaller than a distance between the CF substrate and the TFT substrate, and the black matrix comprises a plurality of trenches, and each of the trenches penetrates the black matrix to form a hollow construction, and the sealant is positioned on the black matrix and fills in the trenches for assembling and attaching the CF substrate and the TFT substrate.

The sealant is black sealant.

An OD value of the black sealant is 3.2.

The plurality of trenches is evenly spread out along respective sides of the black matrix.

The trenches are rectangular trenches.

The liquid crystal display panel structure further comprises a photosensitive spacer material retaining wall, and the photosensitive spacer material retaining wall is positioned between the sealant and the active area, and a height thereof is same as a height of a cell gap.

The present invention further provides a manufacture method of a Liquid crystal display panel structure, comprising steps of:

Step 1, providing a CF substrate and a TFT substrate;

Step 2, forming a black matrix at periphery of an active area on the CF substrate;

Step 3, opening a plurality of trenches in the black matrix with one mask exposure, and each of the trenches penetrates the black matrix to form a hollow construction;

Step 4, coating sealant on the black matrix, and the sealant fills in the plurality of trenches at the same time;

Step 5, assembling the CF substrate and the TFT substrate;

Step 6, solidifying the sealant to attach the CF substrate and the TFT substrate together.

The step 2 further comprises forming a photosensitive spacer material retaining wall between the active area and the black matrix on the CF substrate.

The sealant is black sealant, and an OD value of the black sealant is 3.2.

The plurality of trenches is evenly spread out along respective sides of the black matrix, and the trenches are rectangular trenches.

The benefits of the present invention are: according to the liquid crystal display panel structure provided by the present invention, the hollow trenches are formed in the black matrix and the sealant fills in the trenches to make the CF substrate directly contact not merely the black matrix but the sealant too. Accordingly, the adhesive force between the black matrix and the CF substrate is promoted to prevent the separation of the CF substrate and the TFT substrate without any additional cost and influence to the narrow frame formation of the liquid crystal display panel. According to the manufacture method of the liquid crystal display panel structure provided by the present invention, by opening a plurality of trenches in the black matrix and filling in the trenches with the sealant to make the CF substrate directly contact the black matrix and the sealant. Under circumstance of adding zero cost, the adhesive force between the CF substrate and the TFT substrate is promoted to prevent the separation of the CF substrate and the TFT substrate.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution, as well as beneficial advantages, of the present invention will be apparent from the following detailed description of an embodiment of the present invention, with reference to the attached drawings.

In drawings.

DETAILED DESCRIPTION OF PREFERRED EMBODIMENTS

In order to better understand the characteristics and technical aspect of the invention, please refer to the following detailed description of the present invention is concerned with the diagrams.

Figure 2:
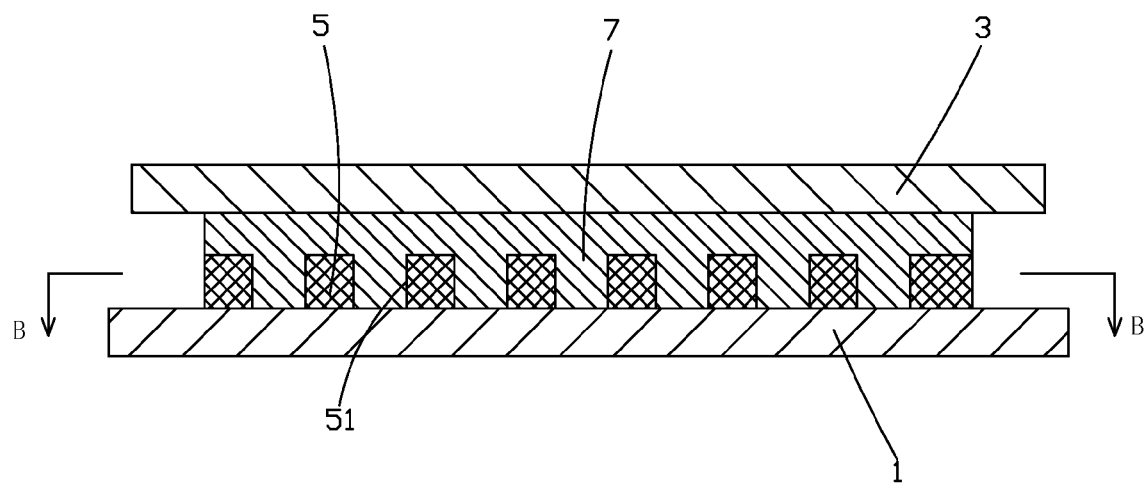
FIG. 2 is a sectional diagram of a liquid crystal display panel structure according to the present invention.
Figure 3:
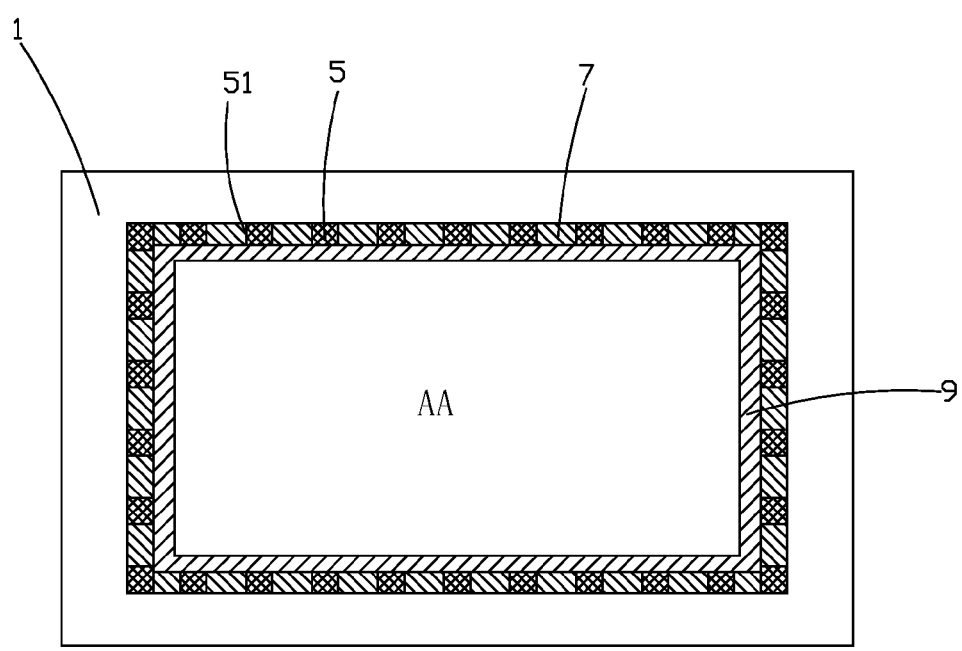
FIG. 3 is a sectional diagram in accordance with the B-B line in FIG. 2.

Please refer to FIG. 2 and FIG. 3 at the same time. The present invention provides a liquid crystal display panel structure. The liquid crystal display panel structure comprises a CF substrate 1, a TFT substrate 3 oppositely positioned to the CF substrate 1, a liquid crystal layer (not shown) filled between the CF substrate 1 and the TFT substrate 3, sealant 7 coated between the CF substrate 1 and the TFT substrate and a black matrix 5 arranged between the CF substrate 1 and the TFT substrate 3

The black matrix 5 is positioned at periphery of an active area AA on the CF substrate 1, and a height thereof is smaller than a distance between the CF substrate 1 and the TFT substrate 3. That is, a gap exists between the black matrix 5 and the substrate 3. The black matrix 5 comprises a plurality of trenches 51, and each of the trenches 51 penetrates the black matrix 5 to form a hollow construction, and exposes the surface of the CF substrate 1 under the trench 51. Furthermore, the plurality of trenches 51 is evenly spread out along respective sides of the black matrix 5. The trenches 51 are rectangular trenches. The distance between each two adjacent trenches 51 and the distribution density of the trenches 51 can be adjustable based on design demands.

The sealant 7 is positioned on the black matrix 5 and fills in the trenches 51. With the sealant 7, the CF substrate 1 and the TFT substrate 3 are assembled and attached. Because the trench 51 of the black matrix 5 has a hollow construction and the sealant 7 fills in the trenches 51. That is, the sealant 7 directly contacts the CF substrate 1 to promote the adhesive force between the black matrix 5 and the CF substrate 1 and effectively prevent the separation of the CF substrate and the TFT substrate without neither additional cost nor influence to the narrow frame formation of the liquid crystal display panel.

Furthermore, the present main sealant appears with cream white color after solidification and forms obvious color contrast with the black matrix. For being more artistic the structure can, the sealant 7 can be black sealant to get close to the color of the black matrix 5. Specifically, the Optical Density (OD) value of the black sealant is about 3.2.

Significantly, the liquid crystal display panel structure further comprises a photosensitive spacer material retaining wall 9, and the photosensitive spacer material retaining wall 9 is positioned between the sealant 7 and the active area AA on the CF substrate 1. A height thereof is same as a height of a cell gap. The photosensitive spacer material retaining wall 9 can restricts the flow of the sealant 7 during the coating and solidifying processes to prevent the influence of the sealant 7 to the active area AA and the PI alignment film.

Figure 4:
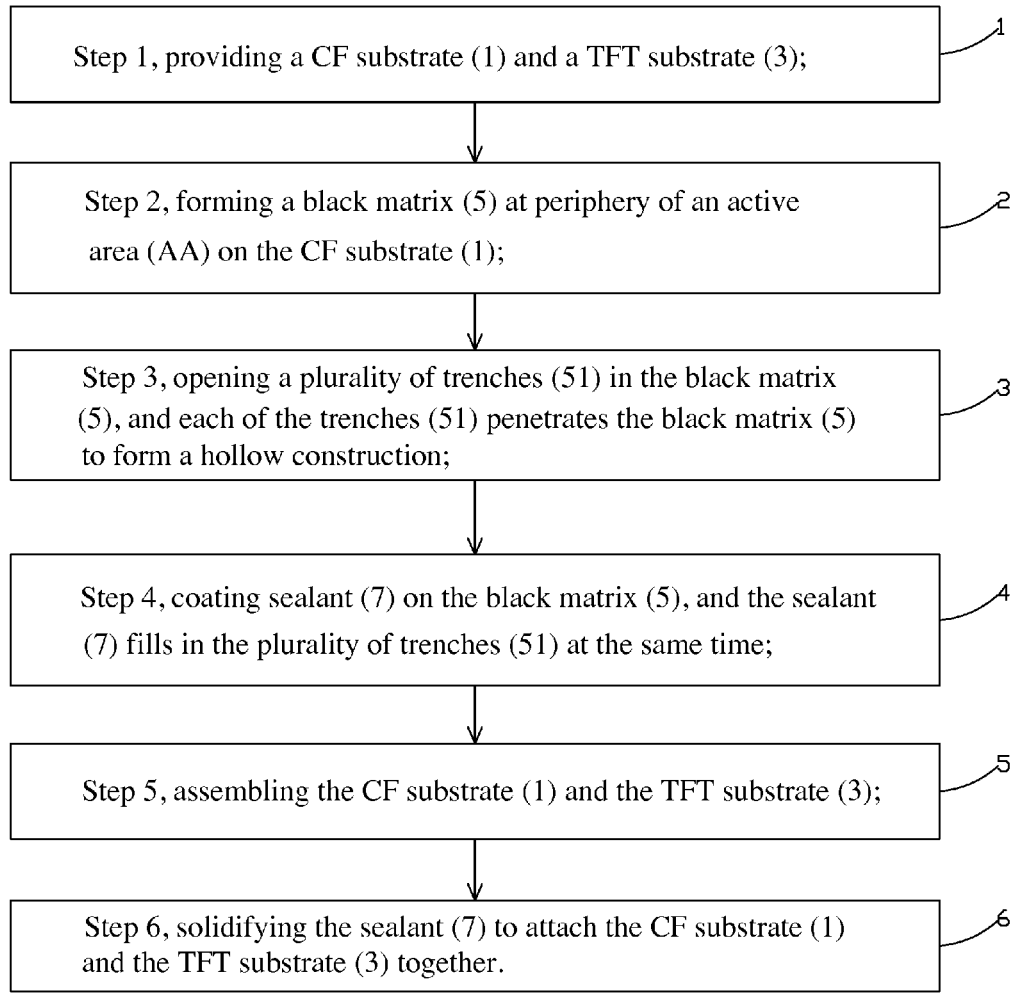
FIG. 4 is a flowchart of a manufacture method of a liquid crystal display panel structure according to the present invention.
Figure 5:
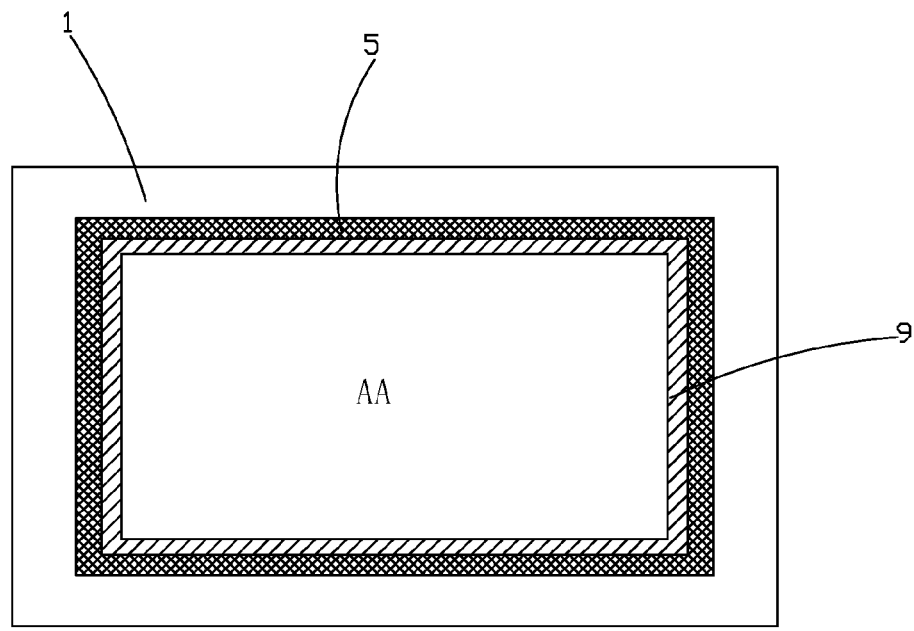
FIG. 5 is a diagram of step 2 of the manufacture method of the liquid crystal display panel structure according to the present invention.
Figure 6:
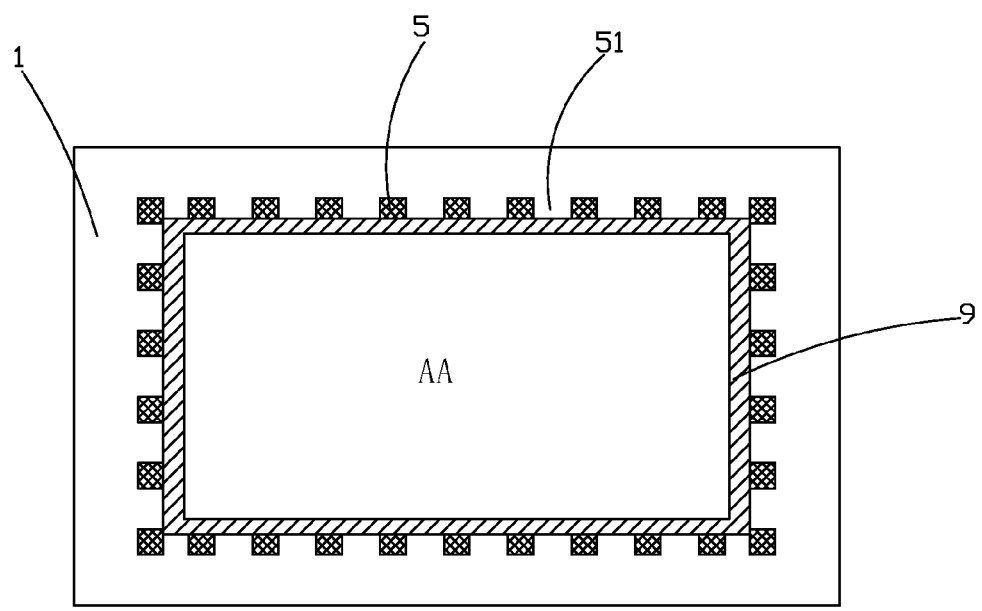
FIG. 6 is a diagram of step 3 of the manufacture method of the liquid crystal display panel structure according to the present invention.

Please refer from FIG. 4 to FIG. 6 in conjunction with FIG. 2, FIG. 3. The present invention further provides a manufacture method of a Liquid crystal display panel structure, comprising steps of:

Step 1, providing a CF substrate 1 and a TFT substrate 3.

Step 2, as shown in FIG. 5, forming a black matrix 5 at periphery of an active area AA on the CF substrate 1.

The black matrix 5 formed in the Step 2 can be a continuously distributed rectangular.

For preventing the flow of the sealant during the following coating and solidifying processes to prevent the influence of the sealant 7 to the active area AA and the PI alignment film, the Step 2 further comprises forming a photosensitive spacer material retaining wall 9 between the active area AA and the black matrix 5 on the CF substrate 1. The height of the photosensitive spacer material retaining wall 9 can be determined according to the given cell gap of the liquid crystal layer.

Step 3, as shown in FIG. 6, opening a plurality of trenches 51 in the black matrix 5, and each of the trenches 51 penetrates the black matrix 5 to form a hollow construction.

Specifically, the plurality of trenches 51 is evenly spread out along respective sides of the black matrix 5, and the trenches 51 are rectangular trenches.

The Step 3 is to expose the black matrix 5 with one mask. Ultimately, the plurality of trenches 51 is formed without any additional cost.

After the Step 3 is accomplished, the surface of the CF substrate 1 under the trench 51 is exposed because the trenched 51 are hollow.

Step 4, as shown in FIG. 3, coating sealant 7 on the black matrix 5, and the sealant 7 fills in the plurality of trenches 51 at the same time.

Moreover, the sealant 7 is black sealant to get close to the color of the black matrix 5 to prevent obvious color contrast of the two. Specifically, the OD value of the black sealant is about 3.2.

Figure 1:
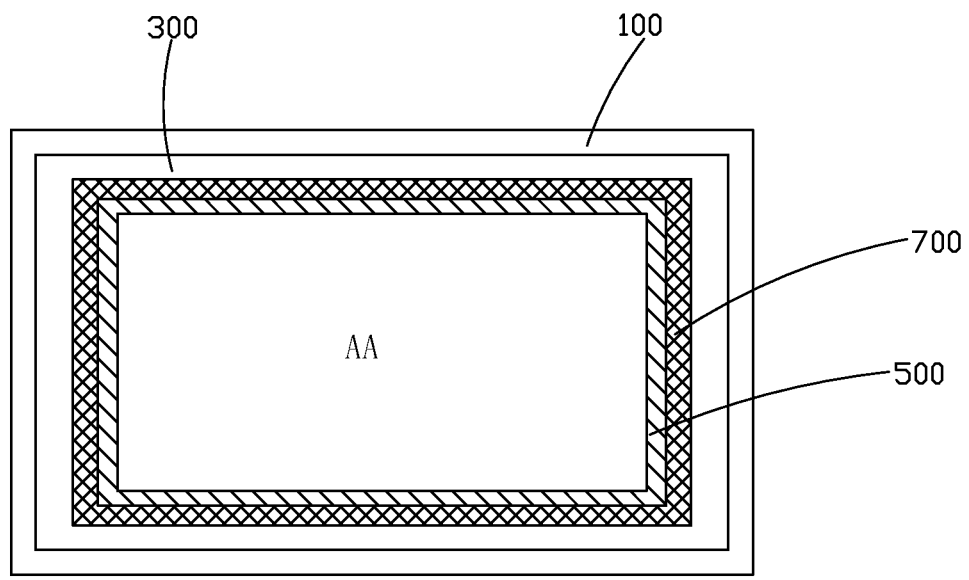
FIG. 1 is a top view diagram of a liquid crystal display panel structure according to prior art.

Step 5, as shown in FIG. 1, assembling the CF substrate 1 and the TFT substrate 3.

Step 6, solidifying the sealant 7 to attach the CF substrate 1 and the TFT substrate 3 together.

In the aforesaid method, because the trench 51 of the black matrix 5 has a hollow construction and the sealant 7 fills in the trenches 51. That is, the sealant 7 directly contacts the CF substrate 1 to promote the adhesive force between the black matrix 5 and the CF substrate 1 and effectively prevent the separation of the CF substrate and the TFT substrate without neither additional cost nor influence to the narrow frame formation of the liquid crystal display panel.

In conclusion, according to the liquid crystal display panel structure of the present invention, the hollow trenches are formed in the black matrix and the sealant fills in the trenches to make the CF substrate directly contact not merely the black matrix but the sealant too. Accordingly, the adhesive force between the black matrix and the CF substrate is promoted to prevent the separation of the CF substrate and the TFT substrate without any additional cost and influence to the narrow frame formation of the liquid crystal display panel. According to the manufacture method of the liquid crystal display panel structure provided by the present invention, by opening a plurality of trenches in the black matrix and filling in the trenches with the sealant to make the CF substrate directly contact the black matrix and the sealant. Under circumstance of adding zero cost, the adhesive force between the CF substrate and the TFT substrate is promoted to prevent the separation of the CF substrate and the TFT substrate.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel structure, comprising a color filter (CF) substrate, a thin film transistor (TFT) substrate oppositely positioned to the CF substrate, a liquid crystal layer filled between the CF substrate and the TFT substrate, sealant coated between the CF substrate and the TFT substrate and a black matrix arranged between the CF substrate and the TFT substrate, wherein the black matrix is positioned at a periphery of an active area on the CF substrate and has a height that is smaller than a distance between the CF substrate and the TFT substrate, and the black matrix comprises a plurality of trenches, and each of the trenches penetrates the black matrix to form a hollow construction, and the sealant is positioned on the black matrix and fills in the trenches for assembling and attaching the CF substrate and the TFT substrate;

wherein the black matrix comprises a plurality of blocks distributed along the periphery of the active area, the plurality of blocks being spaced from each other and alternating with the trenches, the plurality of blocks of the black matrix having a width measured in a direction substantially perpendicular to the periphery of the active area and parallel to the CF substrate, the width being substantially identical to a width of the sealant measured in the direction.

2. The liquid crystal display panel structure according to claim 1, wherein the sealant is black sealant.

3. The liquid crystal display panel structure according to claim 2, wherein an optical density (OD) value of the black sealant is 3.2.

4. The liquid crystal display panel structure according to claim 1, wherein the black matrix positioned at the periphery of the active area comprises multiple sides connected end by end to enclose the active area and the plurality of trenches is evenly distributed along each of the sides of the black matrix.

5. The liquid crystal display panel structure according to claim 4, wherein the trenches are rectangular trenches.

6. The liquid crystal display panel structure according to claim 1, further comprising a photosensitive spacer material retaining wall, and the photosensitive spacer material retaining wall is positioned between the sealant and the active area and has a height that is substantially the same as a height of a cell gap between the TFT substrate and the CF substrate.

7. A manufacture method of a liquid crystal display panel structure, comprising steps of:

Step 1, providing a color filter (CF) substrate and a thin film transistor (TFT) substrate;

Step 2, forming a black matrix that is positioned at periphery of an active area on the CF substrate;

Step 3, forming a plurality of trenches in the black matrix with one mask exposure, such that each of the trenches penetrates the black matrix to form a hollow construction;

Step 4, coating sealant on the black matrix, such that the sealant fills in the plurality of trenches at the same time;

Step 5, assembling the CF substrate and the TFT substrate; and

Step 6, solidifying the sealant to attach the CF substrate and the TFT substrate together;

wherein the black matrix comprises a plurality of blocks distributed along the periphery of the active area, the plurality of blocks being spaced from each other and alternating with the trenches, the plurality of blocks of the black matrix having a width measured in a direction substantially perpendicular to the periphery of the active area and parallel to the CF substrate, the width being substantially identical to a width of the sealant measured in the direction.

8. The manufacture method of the liquid crystal display panel structure according to claim 7, wherein the second step further comprises forming a photosensitive spacer material retaining wall between the active area and the black matrix on the CF substrate.

9. The manufacture method of the liquid crystal display panel structure according to claim 7, wherein the sealant is black sealant, and an optical density (OD) value of the black sealant is 3.2.

10. The manufacture method of the liquid crystal display panel structure according to claim 7, wherein the black matrix positioned at the periphery of the active area comprises multiple sides connected end by end to enclose the active area and the plurality of trenches is evenly distributed along each of the sides of the black matrix, and the trenches are rectangular trenches.

11. A manufacture method of a liquid crystal display panel structure, comprising steps of:

Step 1, providing a color filter (CF) substrate and a thin film transistor (TFT) substrate;

Step 2, forming a black matrix that is positioned at periphery of an active area on the CF substrate;

Step 3, forming a plurality of trenches in the black matrix with one mask exposure, such that each of the trenches penetrates the black matrix to form a hollow construction;

Step 4, coating sealant on the black matrix, such that the sealant fills in the plurality of trenches at the same time;

Step 5, assembling the CF substrate and the TFT substrate; and

Step 6, solidifying the sealant to attach the CF substrate and the TFT substrate together;

wherein the black matrix comprises a plurality of blocks distributed along the periphery of the active area, the plurality of blocks being spaced from each other and alternating with the trenches, the plurality of blocks of the black matrix having a width measured in a direction substantially perpendicular to the periphery of the active area and parallel to the CF substrate, the width being substantially identical to a width of the sealant measured in the direction;

wherein the second step further comprises forming a photosensitive spacer material retaining wall between the active area and the black matrix on the CF substrate;

wherein the sealant is black sealant, and an optical density (OD) value of the black sealant is 3.2; and wherein the black matrix positioned at the periphery of the active area comprises multiple sides connected end by end to enclose the active area and the plurality of trenches is evenly distributed along each of the sides of the black matrix, and the trenches are rectangular trenches.

* * * * *